US005872638A

United States Patent [19]
Haze

[11] Patent Number: 5,872,638
[45] Date of Patent: Feb. 16, 1999

[54] FACSIMILE MACHINE FOR STORING AND PRINTING COMMUNICATION LOG INFORMATION DEPENDING ON WHETHER THE LOG INFORMATION MEETS A SPECIFIC CONDITION

[75] Inventor: Toshiro Haze, Kasugai, Japan

[73] Assignee: Brother Kogyo Kabushiki Kaisha, Nagoya, Japan

[21] Appl. No.: 615,136

[22] Filed: Mar. 25, 1996

[30] Foreign Application Priority Data

Mar. 27, 1995 [JP] Japan .................................. 7-067680

[51] Int. Cl.$^6$ ...................................................... H04N 1/00

[52] U.S. Cl. ......................... 358/405; 358/468; 358/404; 358/444

[58] Field of Search .................................... 358/405, 468, 358/404, 444, 440, 437, 403, 402, 448, 434–436, 438, 439, 441; 379/100

[56] References Cited

U.S. PATENT DOCUMENTS

| | | | |
|---|---|---|---|
| 4,494,149 | 1/1985 | Furukawa | 358/404 |
| 5,134,501 | 7/1992 | Satomi et al. | 358/405 |
| 5,335,085 | 8/1994 | Nakatsuma | 358/405 |
| 5,349,447 | 9/1994 | Kuwahara et al. | 358/404 |
| 5,392,136 | 2/1995 | Nobuta et al. | 358/444 |
| 5,396,341 | 3/1995 | Takahashi et al. | 358/404 |
| 5,459,454 | 10/1995 | Nakano | 358/444 |
| 5,515,175 | 5/1996 | Okada | 358/444 |
| 5,579,126 | 11/1996 | Otsuka | 358/405 |

OTHER PUBLICATIONS

Brother Industries, Ltd.; Setup Manual For Fax, Printer & Copier; 1994.

Brother International Corporation; Operations Manual for Fax, Printer, Copier; pp. 9–1 through 9–11 and last page of Operation Manuel.

*Primary Examiner*—Edward L. Coles
*Assistant Examiner*—Cheukfan Lee
*Attorney, Agent, or Firm*—Oliff & Berridge, PLC

[57] ABSTRACT

A facsimile machine stores log information pertaining to facsimile transmission and reception in a facsimile RAM. To output a facsimile management report, log information items are read one by one from the RAM. It is then determined whether the read out log information meets a specific condition. Only log information which does not meet the specific condition is stored in a printer RAM and then printed by a printer. Thus, by taking a condition of log information not needed by the operator and inputting it as the specific condition, for example, log information not desired to be printed can be left out of the printing process.

30 Claims, 9 Drawing Sheets

FACSIMILE MANAGEMENT REPORT

| NO | DOCUMENT NUMBER | REMOTE FAX ID | STARTING TIME | | DURATION | PAGES | MODE | TRANSMISSION TYPE | RESULT |
|---|---|---|---|---|---|---|---|---|---|
| 1 | 0088 | DIRECTOR'S OFFICE | MAR 21 | 10:20 | :08 | 1 | ECM | SEND | OK |
| 2 | 0087 | DIRECTOR'S OFFICE | | 11:20 | :04 | 1 | ECM | SEND | OK |
| 3 | 0091 | FACTORY | | 11:35 | 1:24 | 1 | ECM | SEND | OK |
| 4 | 0088 | CENTER | MAR 21 | 11:30 | :06 | 1 | | CONFIDENTIAL RECEIVE | OK |
| 5 | 0092 | TOKYO BRANCH | | 11:42 | 1:15 | 1 | ECM | CONFIDENTIAL RECEIVE | OK |
| 6 | 0093 | TOKYO BRANCH | | 11:44 | 1:24 | 1 | ECM | RECEIVE | OK |
| 7 | 0098 | 052 811 1505 | | 12:01 | 1:44 | 2 | G3 | RECEIVE | OK |

TOTAL PAGES 55

FIG. 1

FACSIMILE MANAGEMENT REPORT

| NO | DOCUMENT NUMBER | REMOTE FAX ID | STARTING TIME | | DURATION | PAGES | MODE | TRANSMISSION TYPE | RESULT |
|---|---|---|---|---|---|---|---|---|---|
| 1 | 0088 | DIRECTOR'S OFFICE | MAR 21 | 10:20 | :08 | 1 | ECM | SEND | OK |
| 2 | 0087 | DIRECTOR'S OFFICE | | 11:20 | :04 | 1 | ECM | SEND | OK |
| 3 | 0091 | FACTORY | | 11:35 | 1:24 | 1 | ECM | SEND | OK |
| 4 | 0095 | SOMERSET | | 11:51 | | 3 | G3 | SEND | OK |
| 5 | 0088 | CENTER | MAR 21 | 11:30 | :06 | 1 | | CONFIDENTIAL RECEIVE | OK |
| 6 | 0092 | TOKYO BRANCH | | 11:42 | 1:15 | 1 | ECM | CONFIDENTIAL RECEIVE | OK |
| 7 | 0093 | TOKYO BRANCH | | 11:44 | 1:24 | 1 | ECM | RECEIVE | OK |
| 8 | 0098 | 052 811 1505 | | 12:01 | 1:44 | 2 | G3 | RECEIVE | OK |

TOTAL PAGES 55

1
10
P/C
45
I/O
44
CPU
43
ROM
42
RAM
34
PRINTER
6
SHEET FEEDER
41
SENSOR
40
PRINTER CONTROL CIRCUIT
32
INTERFACE
22
FACSIMILE CONTROL CIRCUIT
12
IMAGE READING DEVICE
2
MODEM
16
NCU
18
TELEPHONE LINE
REMOTE FAX
20
OPERATION PANEL
4
CPU
19
ROM
15
RAM
14

FIG. 5

FACSIMILE MANAGEMENT REPORT

| NO | DOCUMENT NUMBER | REMOTE FAX ID | STARTING TIME | | DURATION | PAGES | MODE | TRANSMISSION TYPE | RESULT |
|---|---|---|---|---|---|---|---|---|---|
| 1 | 0088 | DIRECTOR'S OFFICE | MAR 21 | 10:20 | :08 | 1 | ECM | SEND | OK |
| 2 | 0087 | DIRECTOR'S OFFICE | | 11:20 | :04 | 1 | ECM | SEND | OK |
| 3 | 0091 | FACTORY | | 11:35 | 1:24 | 1 | ECM | SEND | OK |
| 4 | 0088 | CENTER | MAR 21 | 11:30 | :06 | 1 | | CONFIDENTIAL RECEIVE | OK |
| 5 | 0092 | TOKYO BRANCH | | 11:42 | 1:15 | 1 | ECM | CONFIDENTIAL RECEIVE | OK |
| 6 | 0093 | TOKYO BRANCH | | 11:44 | 1:24 | 1 | ECM | RECEIVE | OK |
| 7 | 0098 | 052 811 1505 | | 12:01 | 1:44 | 2 | G3 | RECEIVE | OK |

TOTAL PAGES 55

FIG. 8

FACSIMILE MANAGEMENT REPORT

| NO | DOCUMENT NUMBER | REMOTE FAX ID | STARTING TIME | DURATION | PAGES | MODE | TRANSMISSION TYPE | RESULT |
|---|---|---|---|---|---|---|---|---|
| 1 | 0088 | DIRECTOR'S OFFICE | MAR 21 10:20 | :08 | 1 | ECM | SEND | OK |
| 2 | 0087 | DIRECTOR'S OFFICE | 11:20 | :04 | 1 | ECM | SEND | OK |
| 3 | 0091 | FACTORY | 11:35 | 1:24 | 1 | ECM | SEND | OK |
| *4 | 0095 | SOMERSET | 11:51 | | 3 | G3 | SEND | OK |
| 5 | 0088 | CENTER | MAR 21 11:30 | :06 | 1 | | CONFIDENTIAL RECEIVE | OK |
| 6 | 0092 | TOKYO BRANCH | 11:42 | 1:15 | 1 | ECM | CONFIDENTIAL RECEIVE | OK |
| 7 | 0093 | TOKYO BRANCH | 11:44 | 1:24 | 1 | ECM | RECEIVE | OK |
| 8 | 0098 | 052 811 1505 | 12:01 | 1:44 | 2 | G3 | RECEIVE | OK |

TOTAL PAGES 55

FACSIMILE MACHINE FOR STORING AND PRINTING COMMUNICATION LOG INFORMATION DEPENDING ON WHETHER THE LOG INFORMATION MEETS A SPECIFIC CONDITION

BACKGROUND OF THE INVENTION

1. Field of the Invention

The present invention relates to a facsimile machine provided with a function for printing log information pertaining to facsimile transmission and reception, that is, log information indicating when, to whom, and how many pages were sent, or when, from whom, and how many pages were received.

2. Description of the Related Art

Conventionally, this kind of facsimile machine stores for printing all log information pertaining to facsimile transmission and reception, that is, information indicating when, to whom, and how many pages were sent, or when, from whom, and how many pages were received. This is done, for example, by means of a facsimile management report as shown in FIG. 1. "No." in the facsimile management report left-end column indicates a number assigned in the order a document is transmitted or received. "Document Number" is a number automatically assigned upon execution of a facsimile instruction, facsimile reception, or preparation of a report or the like. "Remote Fax ID" includes a name of the recipient recorded in a speed dial directory, a telephone number of the sender/receiver, or the self-recorded ID of the remote facsimile machine. "Starting Time" indicates the time that transmission started. "Duration" indicates the amount of time taken from the start until the end of transmission. "Pages" indicates the number of pages transmitted. "Mode" indicates the mode at the time of transmission. "Transmission Type" indicates the form of the facsimile at the time of transmission. For example, an outgoing facsimile is indicated by "Send", and an incoming facsimile is indicated by "Receive." The result of the transmission is indicated in "Result". For example, if the transmission is successfully completed, then this is indicated by "OK".

In this way, the facsimile management report is able to fully inform an operator of log information indicating when, to whom, and how many pages were sent, or when, from whom, and how many pages were received.

SUMMARY OF THE INVENTION

Generally, facsimile machine manufacturers provide various types of maintenance services to facsimile machines. Those maintenance services are for checking the transmission condition of the facsimile machines. In one conceivable maintenance service, a facsimile machine maintenance technician remote-controls a facsimile machine so that the subject facsimile machine transmits a maintenance data list toward a servicing station of the facsimile machine manufacturer. The maintenance data list includes data indicative of transmission errors occurred to the subject facsimile machine due to faulty telephone lines or lines in poor condition. More specifically, the maintenance data lists include records of protocol communications attained between the subject facsimile machine and remote facsimile machines according to G3/ECM systems, for example.

In order to remote control the subject facsimile machine, the facsimile maintenance technician first operates a facsimile machine at the servicing station to call the subject facsimile machine. The maintenance technician then inputs a remote access code preset for the subject facsimile machine. As a result, the subject facsimile machine enters a remote control mode. Afterward, the maintenance technician inputs a remote control command for controlling the subject facsimile machine to transmit a maintenance data list toward the servicing station facsimile machine.

According to the above-described conventional log information printing function, however, the subject facsimile machine will also print the log information pertaining to the facsimile transmission of that maintenance data list. For example, in FIG. 1, log information pertaining to the facsimile transmission of the maintenance data list is shown in the row of the facsimile management report that reads: "No. 4, Document Number 0095, Remote Fax ID Somerset, 11:51, etc." when the servicing station is located in Somerset, for example.

This kind of log information pertaining to facsimile transmission of the maintenance data list is, however, unnecessary information to the operator of the facsimile machine. Moreover, this kind of log information will possibly confuse the operator's facsimile management.

It is therefore, an objective of the present invention to solve the above-described problems and to provide an improved facsimile machine which enables the operator to have easy and unconfused facsimile management.

In order to attain the above-described objectives and other objectives, the present invention provides a facsimile machine for communicating with a remote facsimile machine, the facsimile machine comprising: communication means for communicating with a remote facsimile machine; information judgement means for judging whether a log information of the communication meets a specific condition; and printing means for printing log information of the communication based on results judged by the information judgement means. The printing means may include first printing means for printing only the log information which does not meet the specific condition. The printing means may include second printing means for printing log information which meets the specific condition in a distinguishable manner from other log information.

According to another aspect, the present invention provides a facsimile machine for transmitting information to and for receiving information from remote facsimile machines, the facsimile machine comprising: setting means capable of setting a specific type of communication; communication means for performing communications with remote facsimile machines so as to transmit information to and receive information from the remote facsimile machines; judgement means for judging whether each of the performed communications, which the communication means has performed, is the set type of communication; and printing means for printing log information of the communications based on the judged result.

The judgement means may include: log information producing means for producing log information of each performed communication; and comparing means for comparing the produced log information with the set communication type.

The setting means may set a remote controlled type communication through specifying a remote access code representative of the remote controlled type communication, the comparing means comparing the log information produced for each communication with the remote access code. The setting means may set, as the specific communication type, a communication with a specific remote facsimile machine through setting a telephone number of the specific remote facsimile machine, the comparing means comparing the log information produced for each communication with the set telephone number.

According to still another aspect, the present invention provides a facsimile machine for transmitting information to and for receiving information from remote facsimile machines, the facsimile machine comprising: setting means capable of setting a desired remote facsimile machine as a specific facsimile machine; communication means for performing communications with remote facsimile machines so as to transmit information to and receive information from the remote facsimile machines; judgement means for judging whether each of the remote facsimile machines, with which the communication means has performed communications, is the set facsimile machine; and printing means for printing log information of the communications based on the judged result.

The printing means may print the log information of the communications in a manner that log information of the communication with the set facsimile machine is distinguishable from log information of the communication with an unset facsimile machine. The printing means may selectively print the log information of the communications with the remote facsimile machines.

BRIEF DESCRIPTION OF THE DRAWINGS

The above and other objectives, features and advantages of the present invention will become more apparent from reading the following description of the preferred embodiments taken in connection with the accompanying drawings in which:

FIG. 1 is a diagram showing an example of a facsimile management report printed by a conventional facsimile machine;

FIG. 5 is a diagram showing an example of a facsimile management report printed by the facsimile machine according to first and second preferred embodiments of the present invention;

FIG. 8 is a diagram showing an example of a facsimile management report printed by the facsimile machine according to the third preferred embodiment of the present invention.

DETAILED DESCRIPTION OF THE PREFERRED EMBODIMENTS

Figure 2:
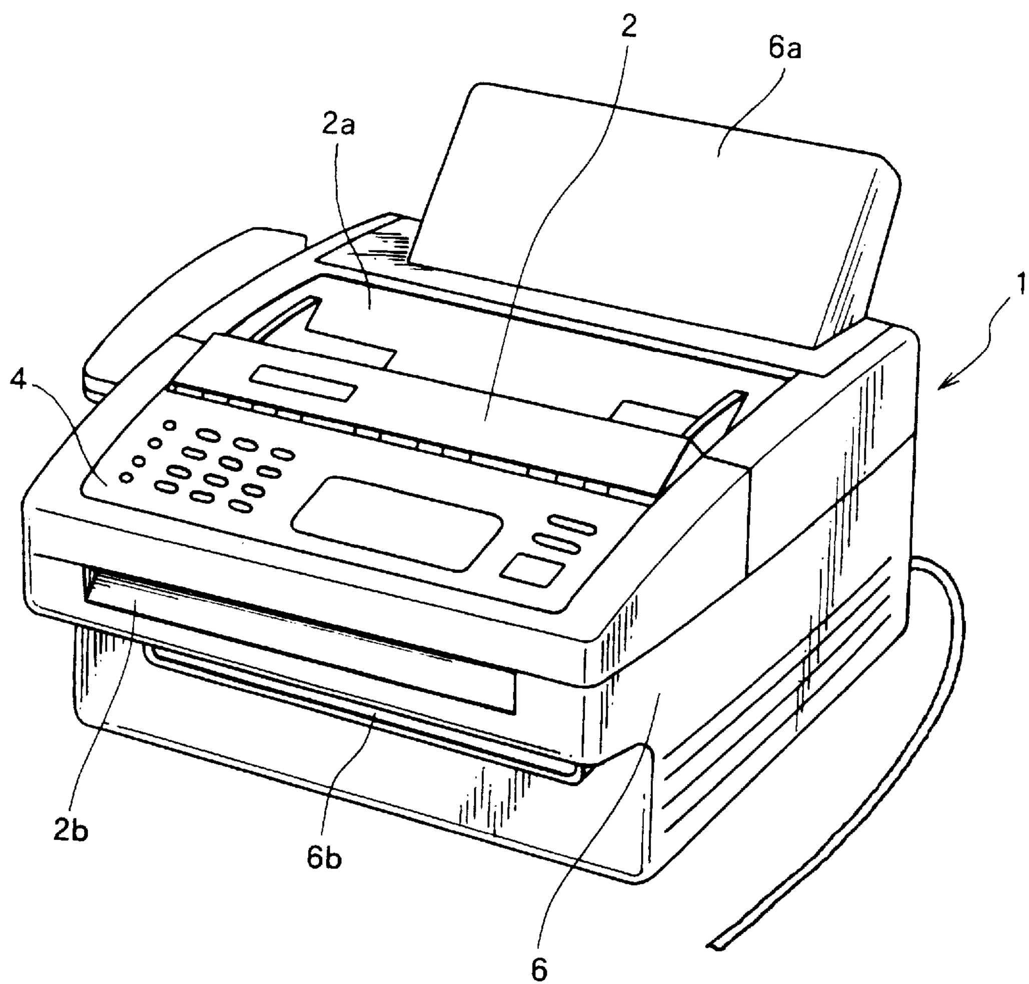
FIG. 2 is a perspective view of a facsimile machine according to first through third preferred embodiments of the present invention.

A facsimile machine according to preferred embodiments of the present invention will be described while referring to the accompanying drawings wherein like parts and components are designated by the same reference numerals to avoid duplicating description.

A facsimile machine according to a first preferred embodiment of the present invention will be described hereinafter with reference to FIGS. 2 through 5.

Figure 3:
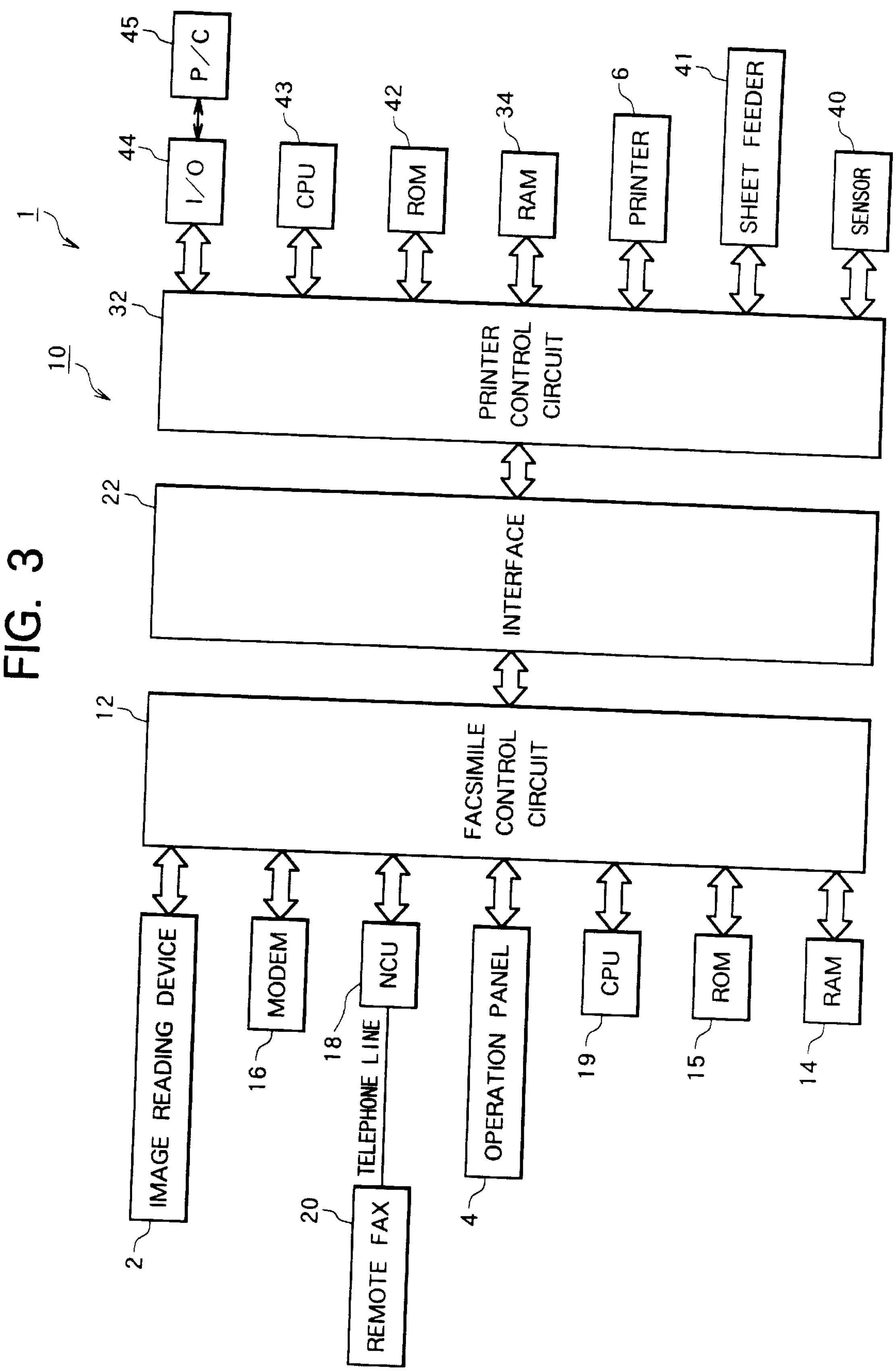
FIG. 3 is a block diagram illustrating a control portion of the facsimile machine of the first through third preferred embodiments.
Figure 4:
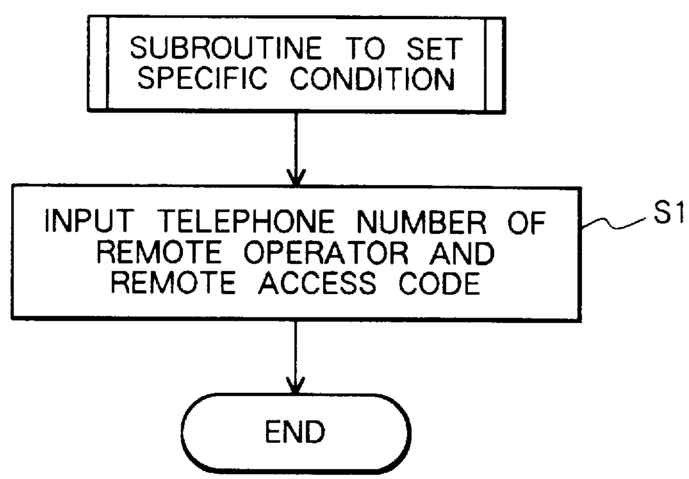
FIG. 4(A) is a flowchart showing a specific condition setting operation according to the first through third preferred embodiments.
FIG. 4(B) is a flowchart showing a facsimile management report printing operation of the facsimile machine according to the first embodiment.
Figure 4:
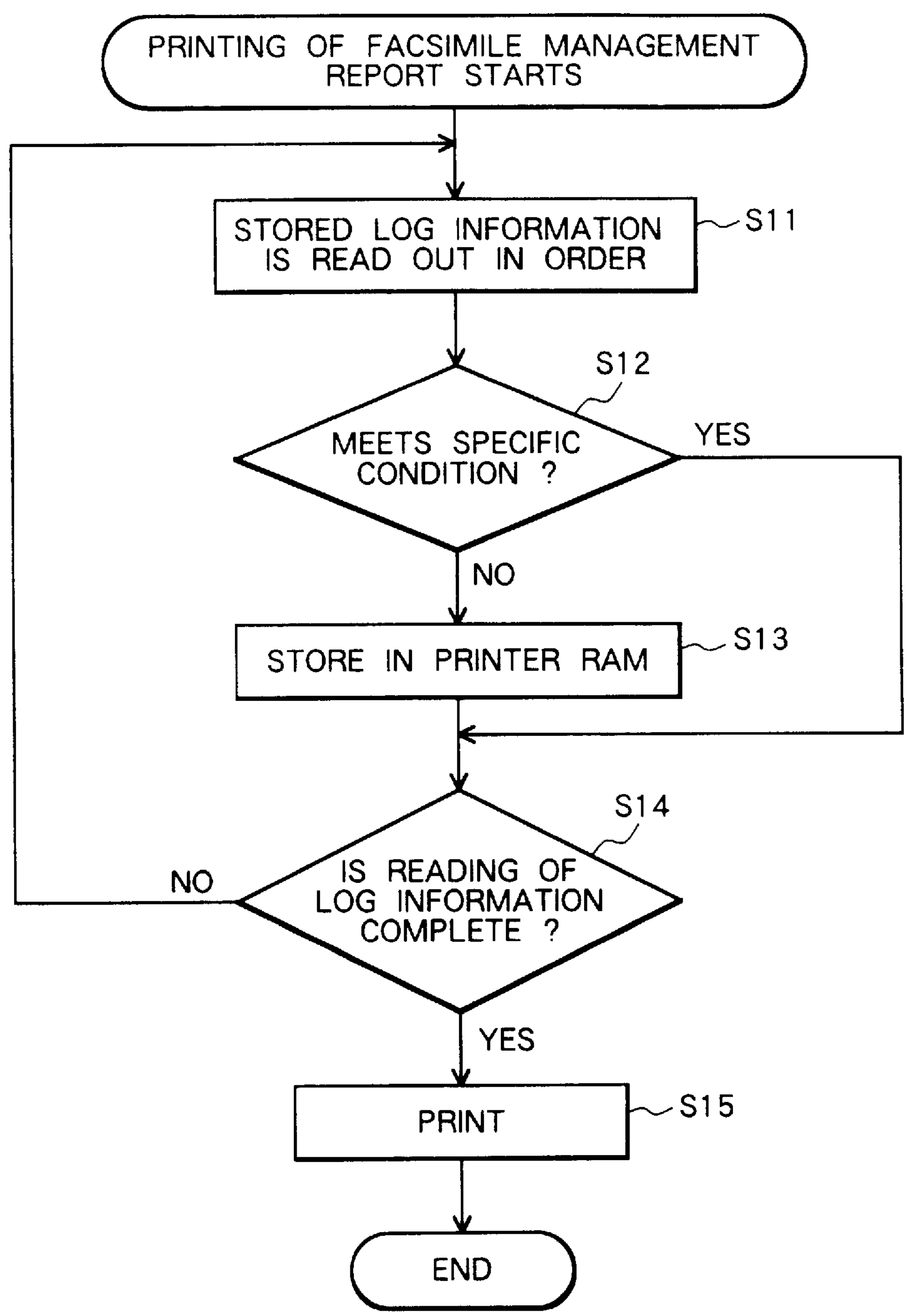

As shown in FIGS. 2 and 3, a facsimile machine 1 according to the present embodiment is provided with an image reading device 2, a printer 6, an operation panel 4, and a control portion 10, which are all incorporated in a single body. The image reading device 2 is installed at the upper front portion of the printer 6. The image reading device 2 is for reading an image from an original and for converting the image into electrical signals for facsimile transmission operation. The printer 6 is for printing an image based on data transmitted from remote facsimile machines. The printer 6 is also for printing a facsimile management report as shown in FIG. 5. The operation panel 4 is located on the upper surface of the image reading device 2. The operation panel 4 is used to operate the facsimile machine 2, to input data, and the like. The operation panel 4 has several keys, such as a transmission start key, number keys, speed dial keys, and the like. The operation panel 4 further includes various function keys, including a facsimile management report print key and a specific condition setting key of the present invention, as will be described later.

The control portion 10 is installed inside the facsimile machine 1. The control portion 10 is for performing facsimile communication operations, including a reception operation for receiving data from remote facsimile machines and a transmission operation for transmitting data toward remote facsimile machines. The control portion 10 is further for performing a specific condition setting operation shown in FIG. 4(A), a facsimile log information storing operation, and a facsimile management report printing operation as shown in FIG. 4(B), which will be described later.

As shown in FIG. 2, the image reading device 2 is provided with: a sheet insertion port 2*a* through which an original is inserted into the image reading device 2; and a sheet discharge port 2*b* from which the original is discharged out of the facsimile machine 1. Although not shown in the drawing, the image reading device 2 has a sheet feeding mechanism for feeding the original inserted from the insertion port 2*a* at a fixed speed until discharging the sheet through the discharge port 2*b*. The image reading device 2 further has a laser source for irradiating a laser beam onto the original which is being fed at the fixed speed, a light guiding mechanism for guiding the laser beam reflected from the original to a CCD camera, and the CCD camera for receiving the guided laser beam and for producing electrical signals in accordance with the intensity of the received laser beam.

The printer 6 is a laser printer, for example. The printer 6 is provided with a sheet cassette tray 6*a* and a sheet discharge port 6*b*. The sheet cassette tray 6*a* stores a stack of a plurality of copy sheets. Although not shown in the drawing, the printer 6 has another sheet feeding mechanism for picking up one copy sheet at a time from the sheet cassette tray 6*a* and for feeding the copy sheet at a fixed speed until discharging the copy sheet toward the sheet discharge port 6*b*. The printer 6 further has a laser which is controlled by electric signals to produce a laser beam with its intensity modulated in accordance with the electric signals. The printer 6 further has a photosensitive drum rotating at a fixed speed about its rotational axis. The laser beam irradiated on the surface of the photosensitive drum imparts an electrical charge to the drum surface in correspondence with the laser beam intensity. A toner supply system is provided in the printer 6 to supply toner to the charged areas of the drum surface. The toner is transferred from the drum surface to the copy sheet which is being fed by the sheet feeding mechanism. The copy sheet thus formed with the toner image is discharged out of the discharge port 6*b*.

As shown in a block diagram of FIG. 3, the control portion 10 is connected to both the image reading device 2 and the printer 6. The control portion 10 mainly includes a facsimile control circuit 12 and a printer control circuit 32 connected via an interface 22 with the facsimile control circuit 12. The facsimile control circuit 12 is connected to the image reading device 2 via a bus line. The printer control circuit 32 is connected to the printer 6 via another bus line.

The facsimile control circuit 12 is for managing facsimile communication operation, i.e., transmission and reception operations. The facsimile control circuit 12 encodes or compresses the electric signals of the original image data produced in the image reading device 2. The facsimile control circuit 12 also decodes image data transmitted from remote facsimile machines. The facsimile control circuit 12 further performs the specific condition setting operation shown in FIG. 4(A) and the facsimile log information storing operation, and the management report printing operation shown in FIG. 4(B).

The facsimile control circuit 12 is further connected via bus lines to: a RAM 14; a ROM 15; a CPU 19; the operation panel 4; a network control unit (NCU) 18; and a modem 16. The network control unit 18 is connected, via a telephone circuit, to remote facsimile machines 20.

The RAM 14 is for temporarily storing the encoded original image data supplied from the facsimile control circuit 12 before transmission. The RAM 14 is also for temporarily storing image data transmitted from remote facsimile machines 20. The RAM 14 is further for storing facsimile log information pertaining to transmission and reception operations which the present facsimile machine 1 has performed with remote facsimile machines 20. The RAM 14 stores the log information based on the facsimile log information storing operation. The facsimile log information indicates when, to whom, and how many pages were sent from the present facsimile machine 1, or when, from whom, and how many pages were received at the present facsimile machine 1. The RAM 14 is also for storing a specific condition set by the specific condition setting operation of FIG. 4(A).

The ROM 15 stores various programs for controlling the image reading device 2, the facsimile control circuit 12, the modem 16, and the NCU 18. The ROM 15 stores the programs for the specific condition setting operation, the facsimile log information storing operation, and the facsimile management report printing operation. The CPU 19 controls these operations based on the programs stored in the ROM 15.

The modem 16 is for receiving the original image data from the RAM 14 and for converting or modulating the original image data into audio tone signals suitable for transmission over the telephone line. The modem 16 is also for converting audio tone signals transmitted from the remote facsimile machines 20 to electric data.

The NCU 18 serves as an interface for receiving the audio tone signals from the modem 16 and for transmitting the audio tone signals to a remote facsimile machine 20. The NCU 18 also receives audio tone signals transmitted from a remote facsimile machine 20 and supplying the audio tone signals to the modem 16. It is noted that the audio tone signals thus transmitted from a remote facsimile machine not only include image data but also include data identifying the sender 20. The sender identifying data is constructed from, for example, data of the telephone number of the sender 20.

The interface 22 is for transferring image data from the RAM 14 toward a printer RAM 34 through the circuits 12 and 32 during the reception operation. The interface 22 is also for transferring log information data from the RAM 14 toward the RAM 34 during the facsimile management report printing operation.

The printer control circuit 32 is connected via a bus line to the printer 6, a RAM 34; a ROM 42; a CPU 43; a sheet feeding device 41; a sensor 40; and an input/output port 44.

The ROM 42 stores various control programs controlling the printer control circuit 32, the printer 6, and the sheet feeding device 41. The CPU 43 controls these elements based on the control programs.

The printer RAM 34 is for temporarily storing image data transferred via the interface 22. The printer 6 reads out the image data and prints out the image data onto copy sheets. The RAM 34 is also for storing the log information which is also transferred via the interface 22. The printer 6 reads out the log information and prints out a facsimile management report shown in FIG. 5.

The sheet feeding device 41 is for controlling the sheet feeding mechanism in the printer 6 and also for controlling the sheet feeding mechanism in the image reading device 2. The sensor 40 is for detecting the sheets fed by the sheet feeding device 41.

The input/output 44 is connectable with an external personal computer 45. The image data temporarily stored in the RAM 34 can be directly transferred to the personal computer 45.

With the above-described structure, the facsimile machine 1 performs a transmission operation as described below.

In order to control the facsimile machine 1 to perform a transmission operation, an operator first locates an original sheet on the sheet insertion port 2*a* and manipulates the keys on the operation panel 4 to designate a remote facsimile machine 20 to which the operator desires to transmit data of the original sheet. For example, the operator manipulates the number keys or the speed dial keys to input the telephone number of the desired remote facsimile machine. When the operator depresses the transmission start key, the facsimile machine 1 starts performing the transmission operation.

In the transmission operation, the original sheet enters the image reading device 2 from the sheet insertion port 2*a*. In the image reading device 2, the sheet is fed at a fixed speed. A laser beam is illuminated on the original sheet surface in a direction substantially normal to the feeding direction. The light reflects off from the original sheet and is guided to the CCD camera, which converts intensity of the reflected light into electric signals, i.e., original image data indicative of characters, diagrams, and the like appearing on the original sheet. The original sheet is then discharged out of the image reading device 2 from the sheet discharge port 2*b*.

The facsimile control circuit 12 receives the original image data, and encodes the original image data. The encoded original image data is transferred to and temporarily stored in the RAM 14. Next, the modem 16 reads out the original image data from the RAM 14 and converts the original image data into audio tone signals suitable for transmission over the telephone circuit. The NCU 18 transmits the audio signals to the operator's designated remote facsimile machine 20. Thus, the transmission operation is completed.

The facsimile machine 1 performs a receiving operation as described below.

When a remote facsimile machine 20 sends audio tone signals to the present facsimile machine 1, the NCU 18 receives the audio tone signals, and the facsimile machine 1 starts performing the receiving operation. The audio signals include image data and data identifying the sender 20. The NCU 18 transfers the audio tone signals to the modem 16, which then converts the audio tone signals to electric signals. Thus converted data is then temporarily stored in the RAM 14. Next, the facsimile control circuit 12 reads out the image data from the RAM 14 and decodes the image data. Then, the decoded data is transferred to the printer RAM 34 through the interface 22 and the printer control circuit 32. The data is temporarily stored in the RAM 34 before being read out by the printer 6.

In the printer 6, copy sheets are fed at the fixed speed one sheet at a time from the sheet cassette tray 6*a*. The printer 6 reads out the image data from the RAM 34, and controls the laser to output a laser beam with its intensity modulated according to the read out image data. The laser beam illuminates the photosensitive drum and imparts an electrical charge on the surface of the photosensitive drum. Toner is adhered to the charged areas of the drum surface and then transferred to the copy sheet. In this way, the image data is converted into an visual image on the copy sheet. The copy sheet with the image is then discharged out of the printer 6 toward the sheet discharge port 6*b*. Thus, the receiving operation is completed.

When a facsimile maintenance technician remote-controls the present facsimile machine 1 from a servicing station of the manufacturer, the present facsimile machine 1 operates as described below.

A certain remote access code is preset to the present facsimile machine 1 and is stored in the RAM 14. When the facsimile maintenance technician operates a facsimile machine 20 at the servicing station to call the present facsimile machine 1, a telephone line is connected between the NCU 18 and the facsimile machine 20. When the remote access code is transmitted from the facsimile machine 20, the present facsimile machine 1 enters a remote control mode. When receiving a remote control command from the sender 20, the facsimile machine 1 operates as required by the remote control command.

In this example, the remote control command includes a command data for controlling the facsimile machine 1 to produce a maintenance data list. The remote control command also includes: data of a telephone number of the facsimile machine 20 at the servicing station, and command data for controlling the facsimile machine 1 to transmit the maintenance data list to the facsimile machine 20. In responsive to the remote control command, therefore, the facsimile control circuit 12 produces a maintenance data list, and performs the above-described transmitting operation to send the data list toward the servicing station.

Every time when the above-described transmission operation is completed, a facsimile log information storing operation is performed. Similarly, every time when the reception operation is completed, a facsimile log information storing operation is performed.

In the facsimile log information storing operation, the facsimile control circuit 12 produces a set of log data (log information) pertaining to the facsimile transmission/reception which the present facsimile machine 1 has just completed. The log data set indicates when, to whom, and how many pages were sent in the transmission operation or when, from whom, and how many pages were received in the reception operation. Then, the facsimile control circuit 12 stores the log data set into the RAM 14.

For example, a log data set for one transmission/reception operation includes several data items: a number assigned in the order in which the transmission or the reception has been performed; a document number indicative of the corresponding transmission/reception operation; information identifying the remote receiver/transmitter 20 to which or from which data has been transmitted; a starting time that transmission or reception started; an amount of time taken from the start until the end of transmission/reception; the number of pages transmitted or received; a mode at the time of transmission/reception; a transmission type (transmission or reception); and a result of the transmission/reception.

It is noted that the information identifying the remote receiver 20, to which data has been transmitted, is constructed from data of a telephone number of the remote receiver 20 which has been designated through the operator's manipulation of the operation panel 4. The data identifying the remote sender 20, from which data has been transmitted, includes data indicative of a telephone number of the remote sender 20, which has been transmitted together with image data from the sender 20.

With the above-described operation, even when a maintenance technician remote-controls the present facsimile machine 1 to transmit a maintenance data list toward the servicing station, the log information of that transmission is produced and stored in the RAM 14. It is noted that the log data set produced for that transmission further includes data of the remote access code and data of the remote control command which have been sent from the servicing station 20. The data of the remote control command includes the telephone number of the servicing station 20.

According to the present invention, in order not to print out such unnecessary log information onto facsimile management reports, the present facsimile machine 1 performs the specific condition setting operation as shown in FIG. 4(A) and the facsimile management report printing operation as shown in FIG. 4(B).

The specific condition setting operation of FIG. 4(A) starts when the operator or the manufacturer of the present facsimile machine 1 depresses the specific condition setting key.

This operation is for setting a specific condition used for judging whether each set of log data stored in the RAM 14 is a specific log information which is unnecessary information to the operator and therefore which should not be printed in facsimile management reports. In this example, the specific log information indicates that a maintenance technician has remote controlled the present facsimile machine to transmit a maintenance data list toward a servicing station. The specific condition can therefore be set through specifying the telephone number of the servicing station facsimile machine and the remote access code used for the remote control operation.

As shown in FIG. 4(A), therefore, the operator or the manufacturer can manipulate, in S1, keys on the operation panel 4 to input the specific condition. In this example, the manufacturer sets the telephone number of the servicing station and the remote access code preset to the present facsimile machine 1. Thus set data of the specific condition is stored in the RAM 14.

It is noted that this specific condition setting operation can be performed any time through simply depressing the specific condition setting key. For example, the manufacturer may perform its setting operation before shipment of the facsimile machine 1. The operator may perform its setting operation at any time in order to obtain management data lists which suit his/her manner of using the facsimile machine 1.

For example, the operator may not need log information of communications (transmission/reception) with a specific remote facsimile machine. In this case, the operator may simply input in S1 a telephone number of the specific remote facsimile machine. In this example, the set specific condition identifies the specific remote facsimile machine with which the present facsimile machine 1 may possibly communicate.

Or, the operator may not need log information of any remote-controlled operations. The operator can remote control the facsimile machine 1 to perform various functions. In order to perform the remote control operation, the operator sends the remote access code to the present facsimile machine 1 from remote telephones or remote facsimile machines. The operator may not need log information of any such remote-controlled operations. In this case, the operator may simply input in SI the remote access code preset to the present facsimile machine 1. In this example, the set specific condition identifies the specific type of communication (i.e., the remote-controlled communication) which the present facsimile machine 1 may possibly perform.

According to the present embodiment, when the operator depresses the management report print key, the facsimile management report printing operation starts as shown in FIG. 4(B).

In this operation, log data sets presently stored in the RAM 14 are read out one by one in order in S11. It is then judged in S12 whether the read out one log data set meets the specific condition stored in the RAM 14. In this example, the remote access code and the telephone number of the servicing station have been set as the specific condition in the RAM 14. Accordingly, it is judged in S12 whether the read out log data set includes both the remote access code and that telephone number. If the log data set does not include the remote access code or the servicing station telephone number and therefore if the log data set does not meet the specific condition (S12; NO), then the log data set is transferred to the printer RAM 34 in S13. On the other hand, if the log data set includes both the remote access code and the servicing station telephone number and therefore if the log data set meets the specific condition (S12; YES), then the log data set is not transferred to the printer RAM 34.

Next, when the reading of all the log data sets stored in the RAM 14 is completed (S14; YES), the log data sets now stored in the printer RAM 34 are printed by the printer 6 in S15 in the form of the management report of FIG. 5. Accordingly, log data sets which meet the specific condition are not printed. In this way, when the facsimile management report is printed, only log information which does not meet the specific condition is transferred from the RAM 14 to the printer RAM 34 and printed in the facsimile management report.

FIG. 5 shows an example of a facsimile management report printed according to this operation. In this operation, log information pertaining to facsimile transmission of a maintenance data list is not transferred from the RAM 14 to the printer RAM 34. Accordingly, log information pertaining to the transmission of the maintenance data list is left out of the facsimile management report. That is, the log information shown in FIG. 1 is not printed: "No. 4, Document Number 0095, Remote Fax ID Somerset, 11:51, etc." Thus, the operator's facsimile management does not become unnecessarily complicated.

It is noted that when the telephone number of a specific remote facsimile machine has been set as the specific condition in the RAM 14, the judging step S12 compares the thus set telephone number with the item in the log data set that indicates a remote facsimile machine with which the present facsimile machine 1 has communicated. If the remote facsimile machine is not the specific remote facsimile machine and therefore if the log data set does not meet the specific condition (S12; NO), then the log data set is transferred to the printer RAM 34 in S13. On the other hand, if the remote facsimile machine is the specific facsimile machine and therefore if the log data set meets the specific condition (S12; YES), then the log data set is not transferred to the printer RAM 34.

Similarly, when the remote access code has been stored in the RAM 14 as the specific condition, the judging step S12 judges whether the read out log data set includes the remote access code. If the log data set does not include the remote access code (S12; NO), then the log data set is transferred to the printer RAM 34 in S13. On the other hand, if the log data set includes the remote access code (S12; YES), then the log data set is not transferred to the printer RAM 34.

In the above-described operation, the log information is judged to meet the specific condition based on the telephone number and/or the remote access code which has been inputted by the operator or the manufacturer. Therefore, judgement of log information can be reliably and easily carried out. The setting of the specific condition is also a simple process.

Though log information of the specific communication is not printed out, log information of all the communications is maintained in the RAM 14. Accordingly, the individual log information can be read and confirmed afterwards. Therefore, log information not printed in the facsimile management report can be managed separately from normal log information, thereby increasing manageability.

It is noted that the management report printing operation can be performed not only responsive to the operator's manipulation of the management report printing key but also can be performed automatically after a predetermined number of facsimile communications have been attained.

Thus, as described above, the facsimile machine of the first embodiment stores log information pertaining to facsimile transmission and reception in the RAM 14 in the facsimile control portion. To output a facsimile management report, log information items are read one by one from the RAM 14. It is then determined whether the read out log information meets a specific condition. Only log information which does not meet the specific condition is transferred to the printer RAM 34 and then printed by the printer 6. Thus, by taking a condition of log information not needed by the operator and inputting it as the specific condition, for example, log information not desired to be printed can be left out of the printing process.

A facsimile machine according to a second preferred embodiment of the present invention will be described hereinafter with reference to FIGS. 5 and 6.

In the facsimile log information storing operation of the first embodiment, log information of all the communications is stored in the RAM 14, and log information which meets the specific condition is left out of the printing stage. However, in the second embodiment, only log information not meeting the specific condition is stored in the RAM 14. That is, log information meeting the specific condition is not stored in the RAM 14.

Figure 6:
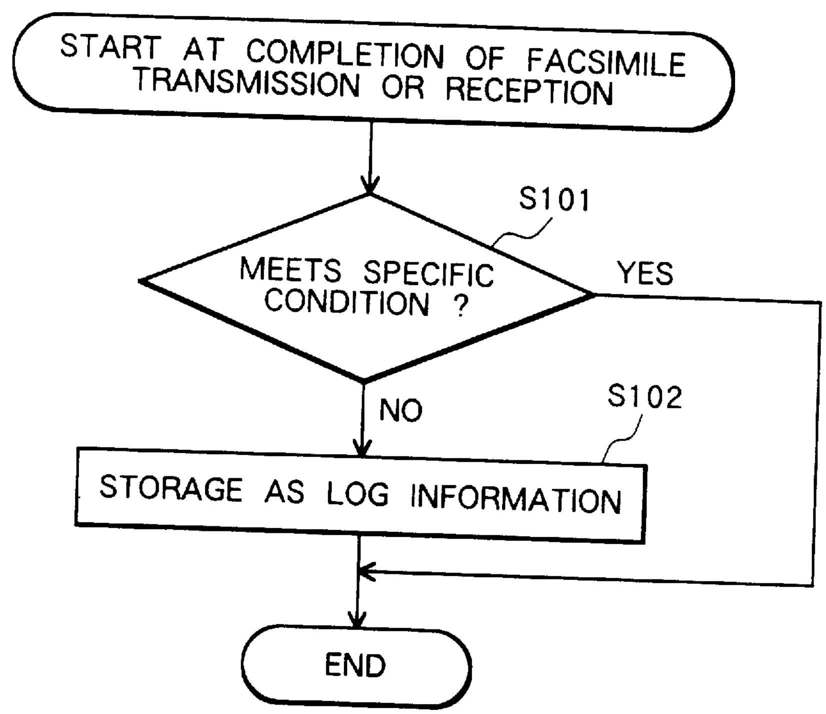
FIG. 6 is a flowchart showing a log information storing operation according to a second preferred embodiment of the present invention.

FIG. 6 shows the modified facsimile log information storing operation of the second embodiment. This operation is conducted every time when a facsimile transmission or reception is completed.

Similarly in the log information storing operation of the first embodiment, when this process starts, the facsimile control circuit 12 produces a set of log data pertaining to the transmission or reception operation which the facsimile machine 1 has just completed. Then, it is judged in S101 whether the produced log data set pertaining to the facsimile transmission or reception meets the specific condition set in the setting operation of FIG. 4(A). More specifically, it is judged whether the transmission or reception, which the facsimile machine 1 has just performed, is the specific communication as set in the RAM 14. For example, S101 judges whether the produced log data set includes both the remote access code and the telephone number of the servicing station facsimile machine. If the facsimile log data set does not meet the specific condition (S101; NO), then the log data set is stored in the RAM 14 in S102. On the other hand, if the log data set meets the specific condition (S101; YES), the process ends without storing the log data. Accordingly, only log data sets not corresponding to the specific condition are stored in the RAM 14.

When the operator depresses the management report print key, a management report printing operation of the second embodiment starts. This operation is the same as the operation of FIG. 4(B) except that S12 is omitted. That is, all the log data sets stored in the RAM 14 are transferred to the printer RAM 34 and printed by the printer 6. In this way, when the facsimile management report is printed, all the log information stored in the RAM 14 is printed in the facsimile management report. Because only log information which does not meet the specific condition is stored in the RAM 14, log information corresponding to the specific condition will not be printed on the facsimile management report. Only log information which does not meet the specific condition will be printed on the facsimile management report.

Accordingly, also in the present embodiment, the same facsimile management report as shown in FIG. 5 can be obtained. That is, also in the present embodiment, log information pertaining to the facsimile transmission for the maintenance data list is not stored in the RAM 14. Accordingly, log information pertaining to the facsimile transmission of the maintenance data list is left out of the facsimile management report. Thus, the operator's facsimile management does not become unnecessarily complicated. Additionally, the memory 14 is not used for unnecessary information. The capacity of the memory 14 can be made smaller.

It is noted that when the telephone number of a specific remote facsimile machine is set in the RAM 14 as the specific condition, the judging step S101 compares the thus set telephone number with the item in the log data set that indicates the remote facsimile machine with which the present facsimile machine 1 has just communicated. Similarly, when the remote access code is simply stored in the RAM 14 as the specific condition, the judging step S101 judges whether the read out log data set includes the remote access code.

A facsimile machine according to a third preferred embodiment of the present invention will be described hereinafter with reference to FIGS. 7 and 8.

In the facsimile machines according to the first and second preferred embodiments, log information meeting the specific condition is not printed. However, in the facsimile machine according to the present embodiment, log information which meets the specific condition is printed appended with an asterisk *.

According to the present embodiment, similarly to the first preferred embodiment, the log information for all the communications are stored in the RAM 14 during the log information storing operation.

Figure 7:
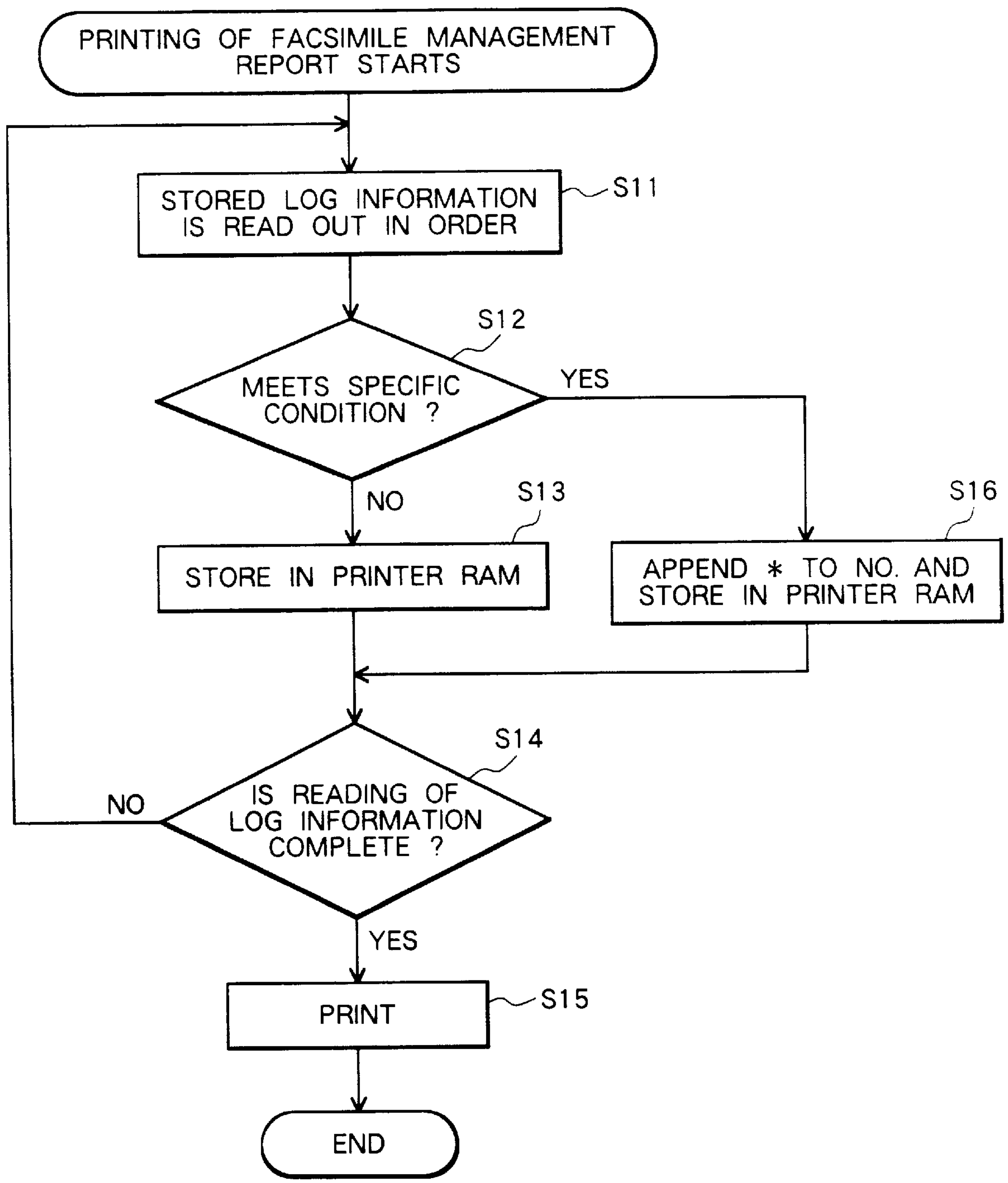
FIG. 7 is a flowchart showing a facsimile management report printing operation for a facsimile machine according to a third preferred embodiment of the present invention.

The facsimile management report printing operation of the present embodiment is shown in FIG. 7. This operation is the same as that of the first embodiment of FIG. 4(B) except that S16 is added to the process of FIG. 4(B).

That is, when the facsimile management report printing operation starts, log data sets stored in the RAM 14 are read one by one in order in S11. It is then judged whether the read out log data set meets the specific condition in S12. If the log information does not meet the specific condition (S12; NO), then the log data set is transferred to the printer RAM 34 in S13. On the other hand, if the log data set meets the specific condition (S12; YES), then an asterisk * is added to the No. column item of the log data set, and the log data set is transferred to the printer RAM 34 in S16. Next, when the reading of all log data sets stored in the RAM 14 is completed (S14; YES), the log data sets now stored in the printer RAM 34 is printed by the printer 6 in S15.

Through this process, log information which meets the specific condition is printed with an asterisk * appended in the No. column. FIG. 8 shows an example of a facsimile management report printed by the facsimile machine according to the present embodiment. As apparent from this drawing, in the present embodiment, log information pertaining to the facsimile transmission for the maintenance data list, that is, "No. 4, Document Number 0095, Remote Fax ID Somerset, 11:51, etc.", is printed with an asterisk * appended in the No. column. As a result, the log information of this maintenance data list transmission is distinguishable from other log information, and facsimile management does not become unnecessarily complicated.

As described above, the facsimile machine of the present invention has a function which stores for printing log information pertaining to facsimile transmission and reception. The facsimile machine judges whether the log information meets a specific condition, and prints only log information which does not meet the specific condition. For example, when a condition of log information not needed by the operator is input as the specific condition, then the log information corresponding to that condition will not be printed.

The facsimile machine selects for printing only log information which does not meet the specific condition from all the log information stored in the log information memory. That is, although all the log information is stored in log information memory, log information which meets the specific condition is left out when printing. As a result, it is still possible to confirm afterwards log information that was not printed.

Or otherwise, the facsimile machine may store in a memory only log information which does not meet the specific condition based on the judged result. For example, when the condition of log information not needing to be stored by the operator is input as the specific condition, then the log information corresponding to that condition will not be stored in the memory, and the information will not be printed. According to this method, the memory is not used for unnecessary information.

The facsimile machine may judge whether log information meets the specific condition and then print in a distinguishable manner log information which meets the specific condition.

Especially when the facsimile machine judges whether log information meets the specific condition based on a telephone number and/or a remote access code, the judgement is reliably and easily performed, and the setting of the specific condition also becomes a simple process.

While the invention has been described in detail with reference to specific embodiments thereof, it would be apparent to those skilled in the art that various changes and modifications may be made therein without departing from the spirit of the invention.

For example, in the above-described third embodiment, log information meeting the specific condition is appended with an asterisk *. However, any method which makes log information distinguishable from log information which does not meet the specific condition is satisfactory. For example, the log information may be printed in bold print or an italics font.

The embodiments describe various examples of the specific condition. For example, because it is unnecessary to print out log information pertaining to the remote-controlled operation to transmit maintenance data lists toward the servicing station, the remote access code and the servicing station telephone number are set as the specific condition. When it is unnecessary to print out log information pertaining to communications with specific remote facsimile machines, the telephone numbers indicative of the specific remote facsimile machines are set as the specific condition. When it is unnecessary to print out log information pertaining to remote-controlled operations, the remote access code is set as the specific condition.

However, various other items can be set as the specific condition. For example, when it is unnecessary to print out log information of a certain remote-controlled operation, both the remote access code and a remote control command indicative of the content of the control may be set as the specific condition. When it is unnecessary to print out log information of a certain transmission type, data indicative of the certain transmission type may be set as the specific condition. For example, when the operator does not need the log information of any reception operations, the operator may set the type of reception as the specific condition. In this case, the facsimile machine will print facsimile management reports where the log information of only transmission operations is listed or where the log information of transmission is printed in a distinguishable manner from the log information of reception.

I claim:

1. A facsimile machine for communicating with a remote facsimile machine, the facsimile machine comprising:

communication means for communicating with a remote facsimile machine;

storing means capable of storing log information of the communications which the communication means has performed;

printing means capable of printing log information of the communications stored in the storing means; and control means for performing either one of a storing control and a printing control, the control means performing the storing control after the communication means has completed each communication, the storing control being for controlling the storing means to or not to store or transit the log information of the communication in a manner determined by whether the log information of the communication meets a specific condition, the printing control being for controlling the printing means to print the log information of the communications stored in the storing means in a manner determined by whether the log information of the communications meets the specific condition.

2. The facsimile machine as claimed in claim 1, wherein the control means controls the printing means to print only the log information which is stored in the storing means and which does not meet the specific condition.

3. The facsimile machine as claimed in claim 2, further comprising information judgment means for judging whether the log information of the communications stored in the storing means meets the specific condition, wherein the control means controlling the information judgment means to perform the judgment before controlling the printing means to selectively print the log information based on the judged result so that the printing means prints only log information that does not meet the specific condition.

4. The facsimile machine as claimed in claim 3, wherein the information judgment means determines whether log information meets the specific condition based on at least one of a telephone number of the remote facsimile machine and a remote access code transmitted from the remote facsimile machine.

5. The facsimile machine as claimed in claim 3, further comprising print instruction means for inputting an instruction to print a log information report, wherein the control means controls, upon receiving the instruction, the information judgment means to judge whether the log information, being presently stored in the storing means, meets the specific condition, the control means controlling the printing means to selectively print the log information based on the judged result.

6. The facsimile machine as claimed in claim 1, wherein the control means controls the storing means, after the communication means completes each communication, to store log information of each communication only when the log information of a communication does not meet the specific condition.

7. The facsimile machine as claimed in claim 6, wherein the control means includes judgment means for judging, every time the communication means completes a communication with the remote facsimile machine, whether the log information of the communication meets the specific condition, the control means controlling the storing means to selectively store the log information based on the judged result.

8. The facsimile machine as claimed in claim 1, wherein the control means controls the printing means to print log information which is stored in the storing means and which meets the specific condition in a distinguishable manner from other log information.

9. The facsimile machine as claimed in claim 8, further comprising information judgment means for judging whether the log information of the communications stored in the storing means meets the specific condition, wherein the control means controlling the information judgment means to perform the judgment before controlling the printing means to selectively print the log information, stored in the storing means, based on the judged result so that the printing means prints the log information which meets the specific condition in a first manner and prints the log information which does not meet the specific condition in a second manner different from the first manner.

10. The facsimile machine as claimed in claim 9, wherein the information judgment means determines whether log information meets the specific condition based on at least one of a telephone number of the remote facsimile machine and a remote access code transmitted from the remote facsimile machine.

11. The facsimile machine as claimed in claim 1, further comprising setting means for setting the specific condition.

12. The facsimile machine as claimed in claim 1, wherein the control means controls the printing means to simultaneously print log information, of a plurality of communications which the communication means has performed, which is stored in the storing means in a manner determined dependent on whether the log information of each communication meets the specific condition.

13. The facsimile machine as claimed in claim 12, wherein the control means controls the printing means to simultaneously print log information of the plurality of communications in a manner that log information that meets the specific condition is distinguishable from other log information not meeting the specific condition.

14. The facsimile machine for transmitting information to and for receiving information from remote facsimile machines, the facsimile machine comprising:

setting means capable of setting a specific type of communication;

communication means for performing communications with remote facsimile machines so as to transmit information to and receive information from the remote facsimile machines;

storing means capable of storing log information of each of communications which the communication means has performed;

printing means capable of printing the log information stored in the storing means; and judgment means for judging whether each of the communications, which the communication means has performed, is the set type of communication, thereby performing either one of a storing control operation and a printing control operation, the storing control operation being for controlling, based on the judged results, the storing means to selectively store the log information of each communication after the communication means performs the communication, the printing control operation being for controlling the printing means to print, in a manner determined based on the judged results, the log information of the communication which is being stored in the storing means.

15. The facsimile machine as claimed in claim 14, further comprising print instruction means for inputting an instruction to print the log information stored in the storing means, wherein the judgment means performs the printing control operation to control the printing means to print the log information of the communications in a manner that log information of the communication of the set communication type is distinguishable from log information of the communication of an unset communication type.

16. The facsimile machine as claimed in claim 14, further comprising storing means for storing data of the set communication type.

17. The facsimile machine as claimed in claim 14, further comprising print instruction means for inputting an instruction to print the log information stored in the storing means, wherein the judgment means controls the printing means not to print the log information of the communications of the set communication type.

18. The facsimile machine as claimed in claim 14, wherein the judgment means performs the storing control operation, every time the communication means completes a communications, so as to control the storing means to store data of the log information of the communications of the unset communication type while controlling the storing means not to store data of the log information of the communications of the set communication type.

19. The facsimile machine as claimed in claim 18, wherein the judgment means includes:

log information producing means for producing log information of each performed communication after the communication means has completed the communication; and comparing means for comparing the produced log information with the set communication type.

20. The facsimile machine as claimed in claim 19, wherein the setting means sets a remote controlled type communication through specifying a remote access code representative of the remote controlled type communication, the comparing means comparing the log information produced for each communication with the remote access code.

21. The facsimile machine as claimed in claim 19, wherein the setting means sets, as the specific communication type, a communication with a specific remote facsimile machine through setting a telephone number of the specific remote facsimile machine, the comparing means comparing the log information produced for each communication with the set telephone number.

22. The facsimile machine as claimed in claim 14, wherein the judgment means performs the printing control operation to control the printing means to simultaneously print the log information, of a plurality of communications which the communication means has performed, which is stored in the storing means in a manner determined based on the judged results.

23. The facsimile machine as claimed in claim 22, wherein the judgment means performs the printing control operation to control the printing means to simultaneously print the log information of the plurality of communications in a manner that log information of the communication of the set communication type is distinguishable from log information of the communication of an unset communication type.

24. A facsimile machine for transmitting information to and for receiving information from remote facsimile machines, the facsimile machine comprising:

setting means capable of setting a desired remote facsimile machine as a specific facsimile machine;

communication means for performing communications with remote facsimile machines so as to transmit information to and receive information from the remote facsimile machines;

storing means capable of storing log information of the communications which the communication means has performed;

printing means capable of printing the log information stored in the storing means; and judgment means for judging whether each of the remote facsimile machines, with which the communication means has performed communications, is the set facsimile machine, thereby performing either one of a storing control operation and a printing control operation, the storing control operation being for controlling, based on the judged results, the storing means to selectively store the log information of each communication after the communication means performs the communication, the printing control operation being for controlling the printing means to print, in a manner determined based on the judged result, the log information of the communications which is being stored in the storing means.

25. The facsimile machine as claimed in claim 24, further comprising print instruction input means for inputting a print instruction, wherein the judgment means controls, upon receiving the print instruction, the printing means to print the log information of the communications stored in the storing means in a manner that log information of the communication with the set facsimile machine is distinguishable from log information of the communication with an unset facsimile machine.

26. The facsimile machine as claimed in claim 24, further comprising storing means for storing data of the set facsimile machine.

27. The facsimile machine as claimed in claim 24, further comprising print instruction input means for inputting a print instruction, wherein the judgment means controls, upon receiving the print instruction, the printing means to print the log information of the communications with facsimile machines other than the set facsimile machine while controlling the printing means not to print the log information of the communication with the set facsimile machine.

28. The facsimile machine as claimed in claim 24, wherein the judgment means judges, every time the communication means has completed a communication, whether the communication has been performed with the set facsimile machine, and controls the storing means to store data of the log information of the communication when the communication has been performed with the unset facsimile machine while controlling the storing means not to store data of the log information of the communication when the communication has been performed with the set facsimile machine.

29. The facsimile machine as claimed in claim 24, wherein the judgment means controls the printing means to simultaneously print the log information, of a plurality of communications which the communication means has performed, which is stored in the storing means in a manner determined based on the judged result.

30. The facsimile machine as claimed in claim 29, wherein the judgment means controls the printing means to simultaneously print the log information of the plurality of communications in a manner that log information of the communication with the set facsimile machine is distinguishable from log information of the communication with an unset facsimile machine.

* * * * *